United States Patent
Williams et al.

(10) Patent No.: US 9,590,696 B2
(45) Date of Patent: Mar. 7, 2017

(54) ANALYSIS OF CAPTURED RANDOM DATA SIGNALS TO MEASURE LINEAR AND NONLINEAR DISTORTIONS

(71) Applicant: Cable Television Laboratories, Inc., Louisville, CO (US)

(72) Inventors: Thomas H. Williams, Longmont, CO (US); Luis Alberto Campos, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 14/735,495

(22) Filed: Jun. 10, 2015

(65) Prior Publication Data

US 2015/0280780 A1 Oct. 1, 2015

Related U.S. Application Data

(62) Division of application No. 13/963,957, filed on Aug. 9, 2013, now Pat. No. 9,209,863.

(51) Int. Cl.

| H04B 3/46 | (2015.01) |
| H04L 12/26 | (2006.01) |
| H04B 10/079 | (2013.01) |
| H04W 24/08 | (2009.01) |

(52) U.S. Cl.
CPC ......... *H04B 3/46* (2013.01); *H04B 10/07953* (2013.01); *H04L 43/08* (2013.01); *H04W 24/08* (2013.01)

(58) Field of Classification Search
None
See application file for complete search history.

(56) References Cited

U.S. PATENT DOCUMENTS

| 6,344,749 B1 | 2/2002 | Williams |
| 6,570,394 B1 * | 5/2003 | Williams ............... H04N 17/00 324/620 |
| 6,687,632 B1 * | 2/2004 | Rittman .................. H04B 3/46 250/336.1 |

(Continued)

OTHER PUBLICATIONS

Notice of Allowance issued in U.S. Appl. No. 14/184,619, mailed Aug. 24, 2015, 8 pages.

(Continued)

*Primary Examiner* — Adolf Dsouza
(74) *Attorney, Agent, or Firm* — Armstrong Teasdale LLP

(57) ABSTRACT

A method to capture random data signals at an end point in a broadband network and process them via digital signal processing (DSP) techniques to determine both linear distortions and nonlinear distortions. In a distribution network, such as a tree and branch cable network, the location of the impairment addition can be identified by determining location of terminals have a distortion and locations of terminals that do not have a distortion. Linear distortions may be determined by an autocorrelation of the captured signal with itself. Nonlinear distortions may be determined by processing measured energy in a vacant band with manufactured energy in the vacant band. If a vacant band is not available, one can be created by demodulating a signal occupying the band, and subtracting the demodulated signal from the measured signal plus interference in a band, leaving only the interference.

14 Claims, 17 Drawing Sheets

(56) References Cited

U.S. PATENT DOCUMENTS

| | | | |
|---|---|---|---|
| RE40,322 E | | 5/2008 | Williams |
| 7,415,367 B2 | | 8/2008 | Williams |
| 9,136,943 B2 | * | 9/2015 | Thompson ......... H04B 10/0795 |
| 2004/0032296 A1 | | 2/2004 | Akaiwa |
| 2005/0233702 A1 | | 10/2005 | Ferguson |
| 2009/0257743 A1 | * | 10/2009 | Chung ................. H04B 10/071 |
| | | | 398/21 |
| 2013/0215953 A1 | | 8/2013 | Currivan et al. |
| 2014/0140522 A1 | | 5/2014 | Deng |

OTHER PUBLICATIONS

Campos et al., "DOCSIS—Upstream Cable Echoes Come in Two Flavors," CED magazine, May 1, 2010, 7 pages.

Invention Disclosure, CableLabs Inventions, Apr. 10, 2012, www.cablelabs.com/about/inventions, 2 pages.

Non-Final Office Action issued in U.S. Appl. No. 13/963,957, mailed Jan. 15, 2015, 10 pages.

Simons, "Technical Handbook for CATV Systems," Third Edition, Publications Department of General Instruments, Jerrod division, 1983, Chapters 4 and 5, p. 1-109.

Notice of Allowance issued in U.S. Appl. No. 13/963,957 mailed on Jul. 24, 2015, 8 pages.

\* cited by examiner

ANALYSIS OF CAPTURED RANDOM DATA SIGNALS TO MEASURE LINEAR AND NONLINEAR DISTORTIONS

CROSS-RELATED APPLICATION

This application is a divisional of U.S. application Ser. No. 13/963,957 filed Aug. 9, 2013, which application is herein incorporated in its entirety by this reference.

BACKGROUND OF THE INVENTION

This invention relates to the detection of linear and nonlinear distortions in equipment, such as those used in cable and wireless systems, as well as in other applications.

Linear and nonlinear distortions are frequently generated in equipment used in cable systems, and in wireless systems. Thus, nonlinear distortions such as second, third or higher order distortion signals may for example be generated by (overdriven) amplifiers and linear distortions may be caused by multi-path reflections (where reflections accompany the original signal), group delay (where signals at different frequencies travel at different velocities) or amplitude tilt (where signals at different frequencies suffer different attenuations). Excessive distortions affect the image and audio quality experienced by consumers and truck-rolls are typically required in conventional cable and wireless systems to test and identify the source of such distortions and to correct them. Needless to say, such services are expensive. It is therefore desirable to provide techniques that can identify the distortion source without resorting to such expensive methods.

SUMMARY OF THE INVENTION

One embodiment is directed to a method for determining the presence of nonlinear distortion in a signal transmitted from a source and received at a site. First samples of the signal received at the site are captured. The first samples have a bandwidth. A measured signal is made from energy measured in a vacant bandwidth within the bandwidth of the first samples. Energy is removed from the first samples in the vacant bandwidth to create second samples which are nonlinearly distorted. A manufactured signal is created using energy in the vacant bandwidth in the second samples. The measured signal and the manufactured signal are processed to measure nonlinear distortion in the signal received at the site.

One more embodiment is directed to a method for measuring nonlinear distortion caused by components of a signal transmission path in a signal transmitted from a source point through the signal transmission path to an end point, where the signal has a bandwidth. An actual distorted signal is captured at the end point in a vacant band within the bandwidth of the signal. The signal before transmission to the end point is captured at the source point. The signal captured at the source point is processed to provide a predicted distortion signal in the vacant band. The predicted distortion signal is processed with the actual distorted signal to measure nonlinear distortion in the signal received at the end point.

Yet another embodiment is directed to a method for determining the presence of nonlinearly distorted symbols in a signal transmitted from a source and received at a site. The signal received at the site is captured. The nonlinearly distorted symbols in the captured signal are demodulated to make clean demodulated symbols. The clean demodulated symbols are nonlinearly distorted to make a manufactured distortion signal. The clean demodulated symbols are subtracted from the nonlinearly distorted symbols in the captured signal to make a measured nonlinear distortion signal. The measured distortion signal and the manufactured distortion signal are processed to measure nonlinear distortion in the signal received at the site.

Still another embodiment is directed to a method for determining the nonlinear distortion introduced by an electronic component having an input receiving an input signal and an output providing an output signal in response to the input signal. Energy is removed in a vacant band in the received input signal to create samples. The samples are nonlinearly distorted to make a manufactured signal. Energy is removed in a vacant band in the received output signal to create a measured signal. The measured signal and the manufactured signal are processed to measure nonlinear distortion caused by the electronic component.

Yet one more embodiment is directed to a method for determining a linear distortion in a signal path. A wideband noise-like signal is captured at an endpoint of a signal path containing linear distortion. The captured wideband noise-like signal is processed with an autocorrelation algorithm. A time delay is measured as time between impulses on an autocorrelation plot obtained from the processing.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

DETAILED DESCRIPTION OF EXEMPLARY EMBODIMENTS

Figure 1A:
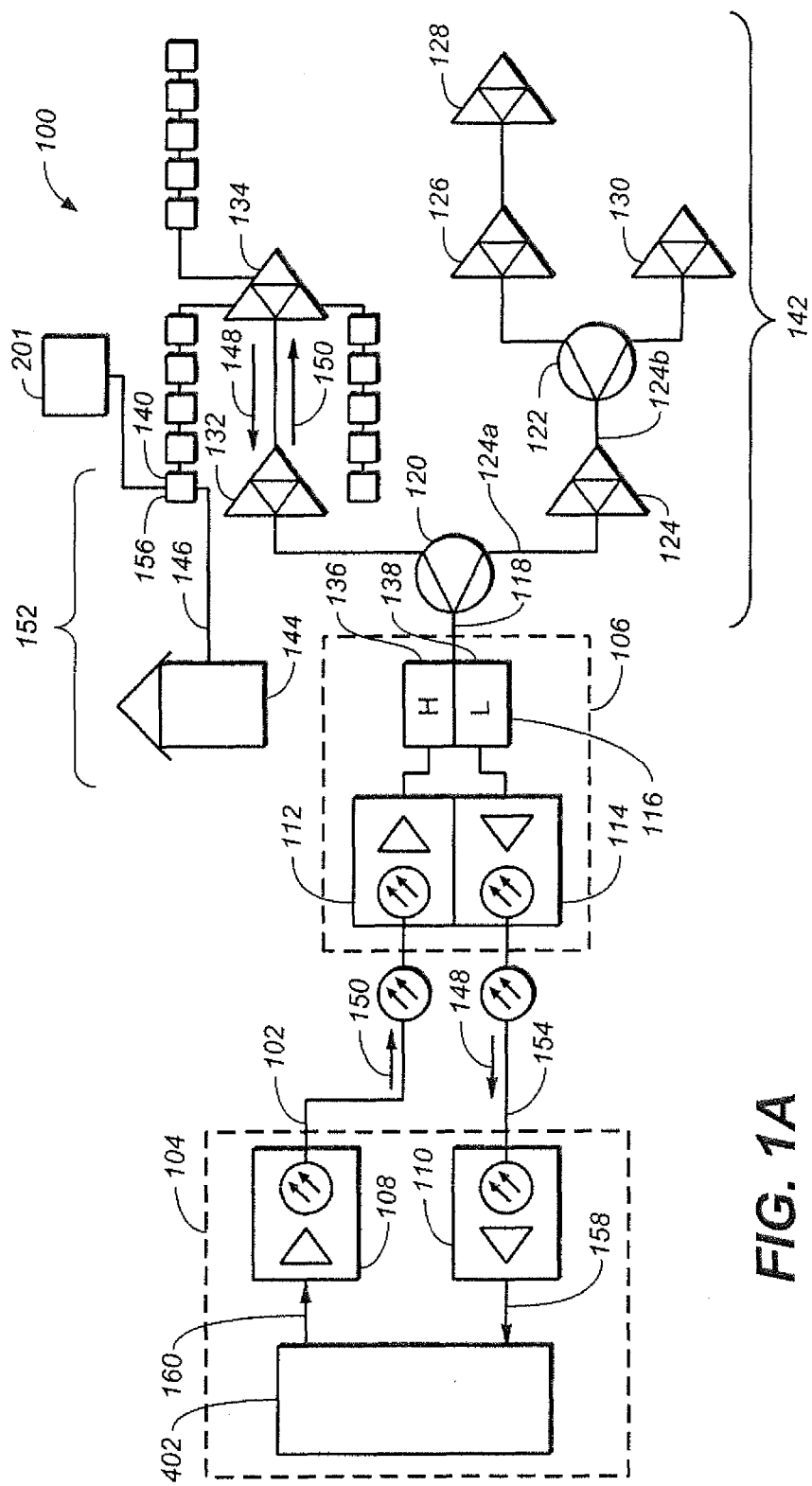
FIG. 1A is a block diagram of a simplified bi-directional hybrid fiber optic coaxial cable system useful for illustrating one embodiment of the invention.

In cable systems, two-way hybrid fiber coax (HFC) cable systems typically provide two-way communications for end users (typically homes or businesses) using both coaxial cable and fiber optic cable. A headend is a collection point for downstream signals and a termination point for upstream signals. "Downstream" or "forward" means signals traveling away from the headend and "upstream" or "reverse" means signals traveling toward the headend. The coaxial portion of cable networks uses a tree-and-branch architecture to split downstream signals and combine upstream signals. On the coaxial portion of the cable plant, downstream signals are sent from a headend to an end user in a downstream frequency band, which may be 54 to 860 MHz. The composite downstream signal is typically comprised of analog television signals in the lower frequencies, such as 54 to 550 MHz, and digital television signals and cable modem traffic in the upper frequency band, such as 550 to 860 MHz. Upstream signals travel from the end users to the headend in the 5 to 42 MHz upstream frequency band over the same coaxial cable that is used for downstream communications. The fiber portion of the plant is typically nearer to the headend and transports signals a long distance to a cluster of subscribers in a group called a node. The point at which the downstream fiber optic (light) signals are converted to downstream electrical signals for transmission over coaxial cable is called a fiber node. The upstream electrical signals are also converted into fiber optic signals at the fiber node for transmission back to the headend. In larger plants there may be additional signal distribution/collection points called "hubs". In the United States the downstream is typically divided into 6 MHz channels that usually contain analog NTSC carriers or digital carriers. Normally, upstream channel frequency and spacing is not uniform FIG. 1A is a drawing of a hybrid fiber coax (HFC) cable system 100 useful for illustrating one embodiment of the invention. The origination/terminating point for cable signals is a hub site 104. In large cable systems multiple hub sites will connect back to a central headend (not illustrated). For purposes of this discussion the terms headend and hub can be used interchangeably. Inside hub site 104 is a cable modem termination unit 402 and a fiber optic transmitter 108 and fiber optic receiver 110. Fiber optic cables 102 and 154 connect the hub site to remote fiber optic nodes, such as fiber optic node 106 which can be 50 kilometers away. Typically different fiber optic cables are used for the downstream direction and the upstream direction. At a fiber node, the optic signals are converted to/from RF (radio frequency) electrical signals and distributed over coaxial cable 118. Downstream radio frequency signals 150 flow in the 54 to 860 MHz band from the fiber node to the end points that may be homes 144 with terminals such as cable modems (CMs) (not illustrated). Upstream signals 148 flow in the 5-42 MHz band from the end points back to the fiber nodes. Cascaded two-way amplifiers 124, 126, 128, 130, 132, and 134 boost the RF signals as needed to compensate for cable losses. Simultaneous two-way amplification of signals is possible because the two-way amplifiers have diplex filters, which separate downstream and upstream signals. Splitters 120 and 122 and directional couplers are used to create a tree-and-branch architecture. Signals are extracted from, and inserted into the cable lines by taps 140 to provide signals to end points with terminals. The connections between taps and homes are normally done with flexible coaxial cable called drop cable 146. In different parts of the world HFC systems are used with different frequency splits and different construction practices. Amplifiers, such as amplifier 124 typically have input test points, such as input test point 124a and output test points, such as output test point 124b).

In the past, the downstream signals have been primarily analog television signals, but over time have transitioned to mostly digital signals. The digital downstream signals are 6 MHz in width in the US, and 8 MHz in Europe and digital signals may carry entertainment, Internet traffic, or phone traffic. Likewise, wireless signals to/from cell sites can be transported over the lines. Much of the Internet digital traffic is transported via the DOCSIS® specification.

Terminals have developed significantly more processing power and capability in recent years. In particular, they have developed a full-band capture capability where a very high-speed analog-to-digital converter (A-D) digitizes the full band input signal and can store samples of the signal as well as perform DSP operations, such as digital filtering and fast Fourier transforms on the captured samples.

Figure 1B:
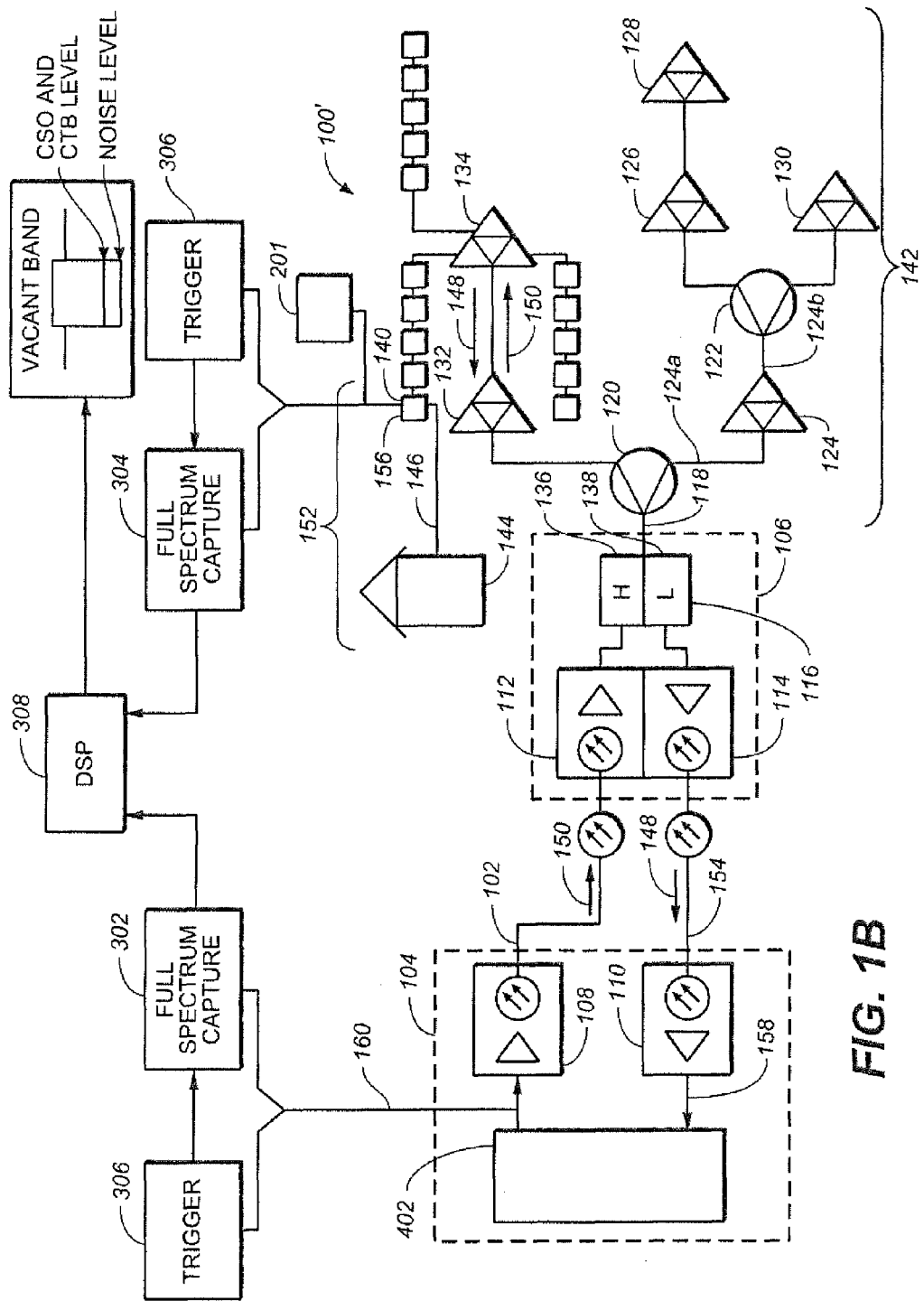
FIG. 1B is a block diagram of a simplified bi-directional hybrid fiber optic drawing of a coaxial cable system useful for illustrating another embodiment of the invention which is a variation of the embodiment in FIG. 1A.

FIG. 1B is a drawing of a hybrid fiber coax (HFC) cable system 100' useful for illustrating another embodiment of the invention which is a variation from the system 100 of FIG. 1A.

Figure 1C:
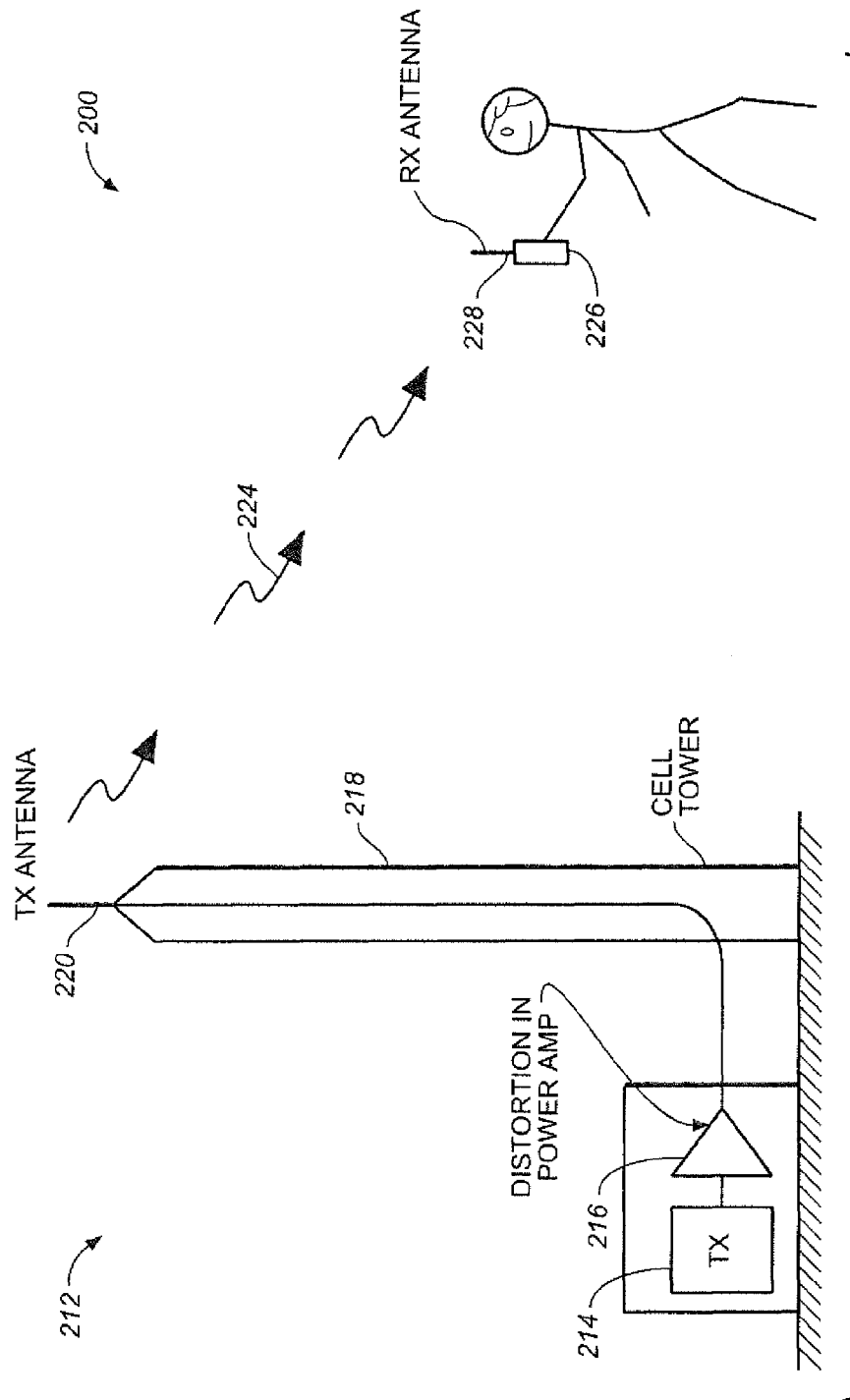
FIG. 1C is a drawing of a wireless system.

FIG. 1C is a drawing of a wireless system 200. The wireless system is comprised of a base station 212 with a transmission source 214, a power amplifier 216 that can create nonlinear distortion, a cell tower 218 with an antenna 220, a wireless signal path 224, and a receiver 226 with an antenna 228.

Discussion Linear Distortion

Linear distortions are created in signal paths, such as the Cable system 100 in FIG. 1A. The linear distortions may be created by multi-path reflections (where reflections accompany the original signal), group delay (where signals at different frequencies travel at different velocities) or amplitude tilt (where signals at different frequencies suffer different attenuations). The article "DOCSIS—Upstream Cable Echoes Come In Two Flavors" by Alberto Campos et al. CED Magazine, May 1, 2010 ("Reference 1") describes echoes in more detail. Echoes, or multipath distortions (not illustrated) can also get into the received signal. Echoes are linear distortions, which do not create energy at new frequencies relative to the source signal. In the frequency domain (FD) a channel response with an echo will have a rippled response, while the same echo in the time domain (TD) is represented by an impulse response with a main response and a delayed response. Because of the duality of time and frequency, the FFT (fast Fourier transform can convert time response into a frequency response, and the IFFT (inverse fast Fourier transform) can convert a frequency response back into the time response. Both FFTs and IFFTs operate on complex numbers.

Figure 2:
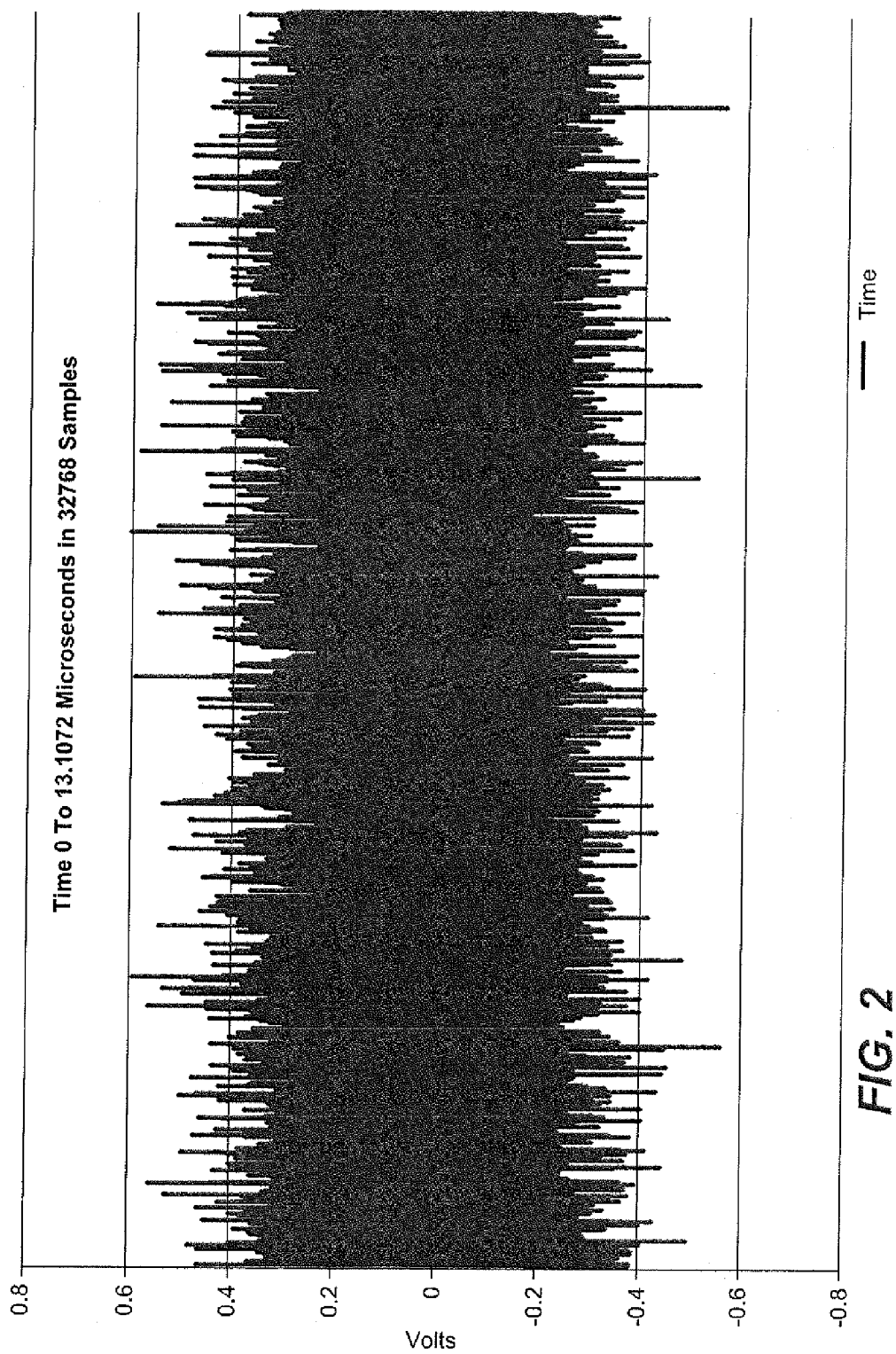
FIG. 2 is a temporal plot of a broadband signal with linear distortion captured on a digital acquisition unit.

FIG. 2 is a temporal plot of a captured downstream Cable digital signal which has been contaminated with an echo. The time samples are taken with 12 bits of precision at a sample rate of 2.5 GSamples per second. The total number of samples is 32768 for a total capture time of 13.1072 microseconds. The signal appears similar to be random (Gaussian) noise due the random nature of component data signals.

Figure 3:
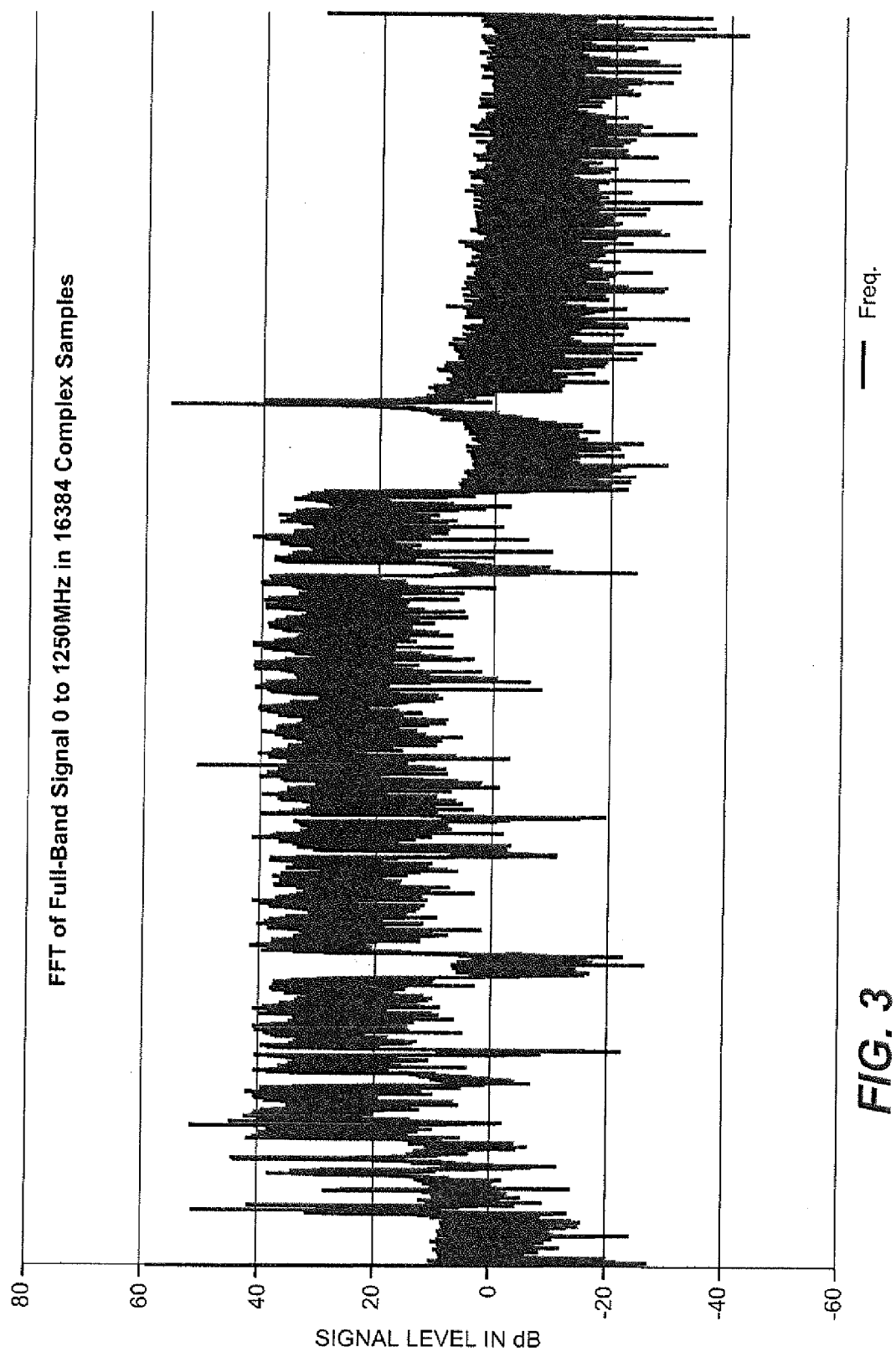
FIG. 3 is a spectral plot of the broadband signal of FIG. 2 after a Fourier transform.

FIG. 3 is spectral plot created by performing a fast Fourier transform (FFT) on the temporal plot of FIG. 2. The FFT was performed by using the time samples of FIG. 2 as the real values, and zero for all imaginary values. This results in 32768 points in the frequency domain, but only frequencies 0-16,383 are unique. Frequencies 16384 to 32767 are complex conjugates of frequencies 0-16,383 and not unique. That is, the real values form a mirror image, and the imaginary form a negative mirror image. "C Language Algorithms for Digital Signal Processing" by Paul M. Embree and Bruce Kimble, Prentice Hall© 1991 may be used as a reference text on digital signal processing (DSP) and the Fourier transform. Note that this particular Cable sample does not have any analog television signals, but does have a few continuous-wave (CW) signals that are used for amplifier automatic gain control adjustment, and to assist plant technicians with alignment. Note also that some RF bands are vacant and not occupied. Likewise there is a maximum frequency, beyond which the band is vacant. Observe that there is a ripple in the magnitude of the signal vs. frequency that has been caused by the echo.

This temporal plot of FIG. 2 was captured with a LeCroy Model HDO6104 digital 12-bit oscilloscope, but other digital acquisition units and terminal devices are capable of capturing the signals. A signal-boosting broadband high-dynamic range amplifier may be needed between the cable line and the oscilloscope to improve a noise figure of data acquisition systems, including digital oscilloscopes.

There are two large advantages associated with this method of discovering linear distortions. One is that an active signal itself is used, rather than a conventional training (or reference, or ghost canceling) signal. This means the cable lines can be tested while in service. Modern cable lines, which provide life-line security and telephony services, cannot be taken down for evaluation with a conventional time domain reflectometer (TDR). The second advantage is that the bandwidth is exceedingly wide), so the delay of the echo can be known with very high accuracy. This means that technicians, when digging to repair damaged cable lines, know exactly where to dig. This is because of the precision of the distance ranging, combined with the knowledge of the velocity of propagation of signals on the cable lines. The accuracy of echo delay detection is inversely proportional to the bandwidth of the echo. Thus, where the downstream signal bandwidth is around 6 MHz, the echo delay measurement accuracy is about 200 ns. In the future the downstream signal bandwidth for just one OFDM (orthogonal frequency division multiplexing) carrier may increase to around 192 Mhz.

Figure 4:
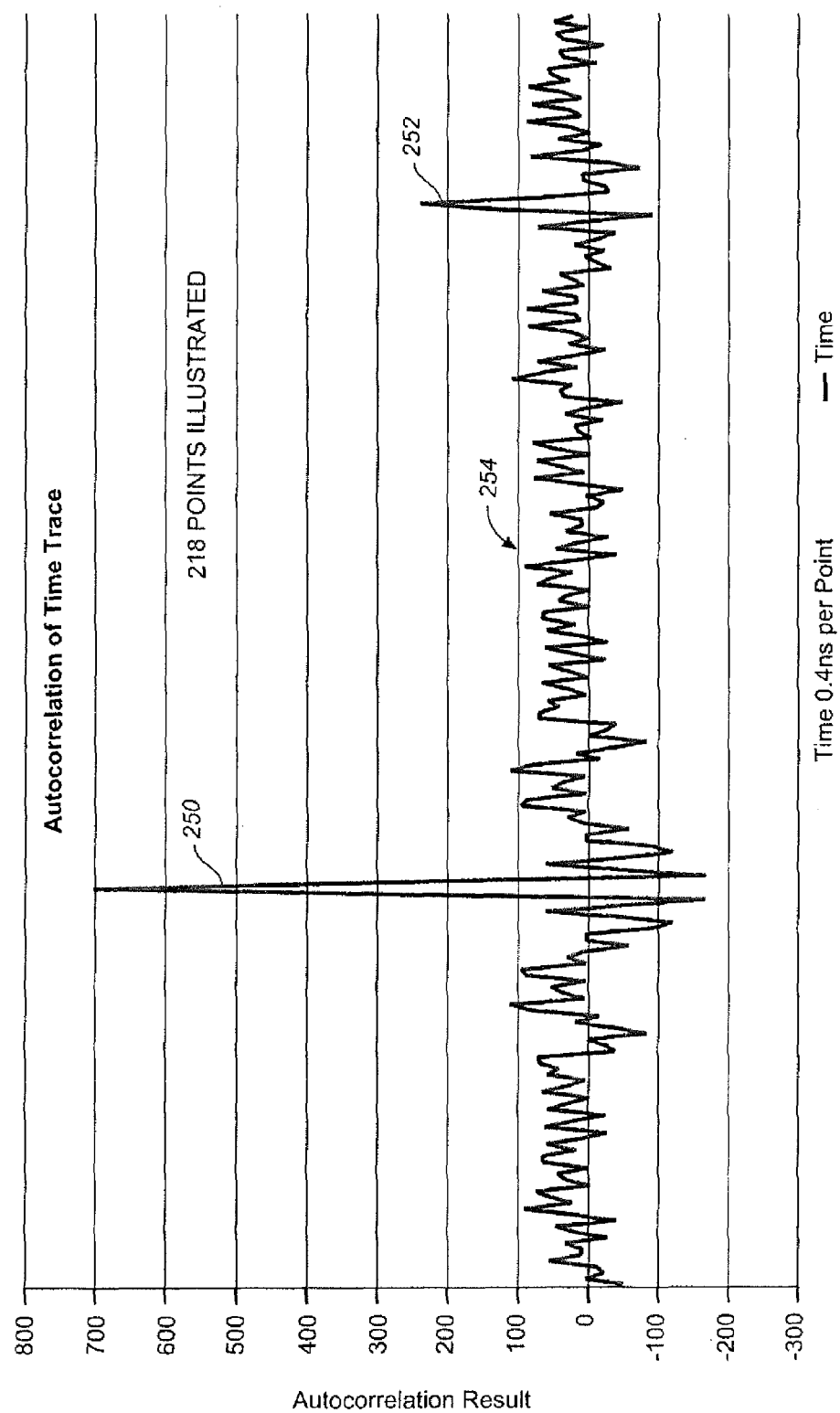
FIG. 4 is an autocorrelation plot of the captured broadband signal.

FIG. 4 is an autocorrelation plot of the temporal signal of FIG. 2 which has been corrupted by an echo, which is a linear distortion. As mentioned above, other potential linear distortions are amplitude tilts, and group delays. Autocorrelation may be performed in the time domain by correlating a time domain signal with itself. In FIG. 2 the TD samples are real-only. Alternately, a more computationally efficient method is to convert the time series into the frequency domain with a FFT, multiply each frequency sample by a complex conjugate of itself, and then convert the products back into the time domain with a IFFT. FIG. 4's temporal plot shows a main signal 250, and a single echo 252. The autocorrelation was done with the 32,768 points of FIG. 2 captured at a sample rate of 2.5 GSamples per second. This gives a maximum echo detection range of 0.4 ns times 32,768, which is 13.1 microseconds. There should be no echo longer than 13 microseconds on cable plant due to cable attenuation and maximum cable spans in use.

Note that there is a pattern 254 on the floor not caused by an echo. This pattern is caused by using captured data with the 6 MHz channels using specification ITU J83-B. The spectrum of each 6 MHz carrier (not illustrated) is not flat, but tapers down on the band edges. If truly random data are captured, this pattern becomes noise-like. With noise-like plots, additional averaging of traces reduces the noise floor further. In the future, wider band noise-like signals are expected to be 192 MHz OFDM the autocorrelation of which will cause a reduction of the pattern on the noise floor. Likewise, the pattern on the noise floor can be compensated for by subtracting the pattern created by wideband signal captured without echoes. For example a wideband signal captured at a hub site would be free of echoes and make a good reference signal from which a reference autocorrelation plot could be made.

Echoes, as described in Reference 1, may be single transit or multi-transit in nature. The echo revealed in FIG. 4 was a single transit echo. If it had been a multi-transit echo there would have been multiple equally-spaced recursions with declining magnitude, and FIG. 4 would then show multiple peaks with declining magnitude all lower in magnitude than the main signal 250 instead of a single smaller peak 252. Note that the downstream signal was captured as a baseband signal (i.e. 0 Hz, or DC). This is not a requirement for this technique to work.

It is also possible to capture and auto-correlate a block of digitals signals as a wideband RF signal. The wider the bandwidth possible, the greater the accuracy of echo delay estimation. A resulting autocorrelation plot will be better when the signal is more noise-like (random). A weaker echo can be observed when a noise floor is lowered.

A reason this technique works well is the random nature of the digital signals. One thing to avoid is periodic signals in the frequency domain, such analog TV signals with a video carrier every 6 MHz, which transforms to periodic picket-fence 166.6 ns signal in the time domain. Thus, it is advisable to filter-out the periodic signals using an analog filter (pre-capture) or a digital filter (post capture) prior to performing the autocorrelation.

Another useful technique to improve performance is to use averaging of multiple autocorrelations results from different capture times to reduce a resulting noise floor.

Figure 5:
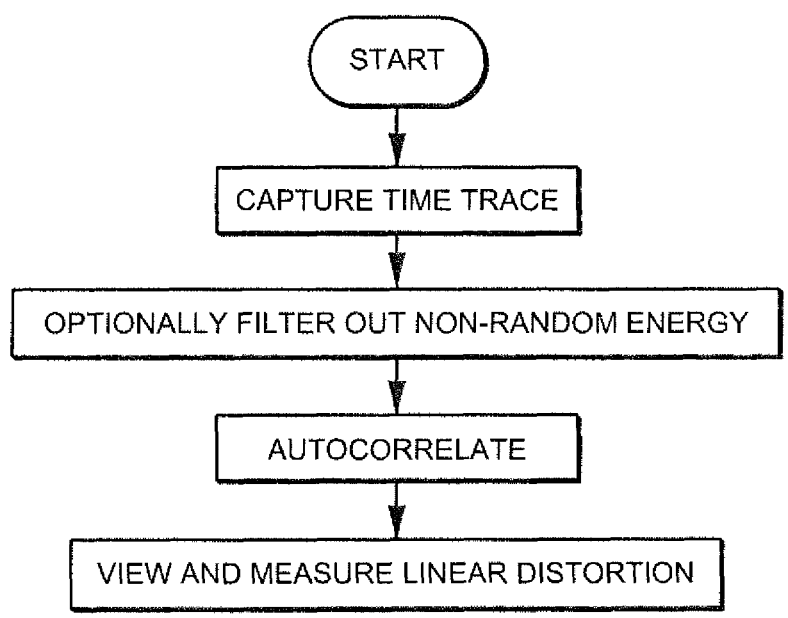
FIG. 5 is a flow diagram to determine linear distortion.

FIG. 5 is a flow diagram for the method to measure linear distortion on a downstream noise-like signal. In a first step the process is started. In a second step the time trace is captured which might contain random energy at some frequencies, and nonrandom energy at other frequencies. In a third optional step the nonrandom energy is filtered out. In a fourth step the filtered time trace is autocorrelated with itself, using either time domain or frequency domain processing, as is known in the art. As noted above, the second step may optionally be repeated at different times to capture multiple time traces, each of which is then filtered in step three and autocorrelated with itself in step four to yield multiple autocorrelations. The multiple autocorrelation results are optionally averaged to yield an averaged autocorrelation. Where the second step is not repeated, steps three and four may be performed using a single time large trace captured in step two. In a fifth step the results of the autocorrelation process from step four are analyzed to measure linear distortion, which may be amplitude tilt, group delay, or echoes. If desired, the linear distortion for just a frequency band with random energy can be analyzed by filtering out all other bands. Processing can be done on baseband signals with real-only values, as illustrated, or on RF signals using complex values. When processing a RF signal, the center of the test band can optionally be shifted in the frequency domain down from its RF frequency to 0 Hz (baseband). This improves the appearance of the impulse response by removing the rotation (or 'spin') associated with demodulating the RF test band not centered at DC.

This embodiment will increase greatly the accuracy of the estimate of the distance to impairment calculation. Since the speed along the signal path (velocity of propogation) of the signal and echo is known, the location of the impairment causing the echo can be calculated from the time lapse between the main signal and the echo in the autocorrelation. If the steps in the autocorrelation are 0.4 ns, for example, the distance accuracy will be a few inches. The service person will thus need to dig only a hole to reach the equipment for repair, instead of a trench.

Discussion Nonlinear Distortion

NonLinear distortions are discussed in Reference 2, which is "Technical Handbook for CATV Systems" (by Ken Simmons, Third edition, Publications Department of General Instruments, Jerrod Division, 1983) in chapters 4 and 5. While linear distortions do not create signals at new frequencies relative to the input signal, nonlinear distortions do.

Nonlinear distortion can be modeled as a Taylor series expansion of a time series signal. A nonlinearly distorted signal could be modeled as:

$$E_{out} = A\ E_{in} + B\ E_{in}^2 + C\ E_{in}^3 + \ldots \quad (1)$$

Where $E_{in}$ is a time-varying input signal, $E_{out}$ is a resulting output signal, A is the linear amplification term, B is a second order term responsible for creating second-order distortions, and C is a third order term responsible for creating third-order distortions. In Cable and wireless systems 100, 100', 200, where multiple signals are present at different frequencies, nonlinear distortion energy in any frequency band can be created from many other signals in other frequency bands. In Cable, composite second order (CSO) is the term used to describe energy created by the "B" term in equation (1) and composite triple beat (CTB) is the term used to describe the energy created by the "C" term in equation (1).

In modern Cable systems, which use push-pull amplifiers to cancel the second order distortion, CTB created by the "C" term should be the dominant distortion.

Figure 6A:
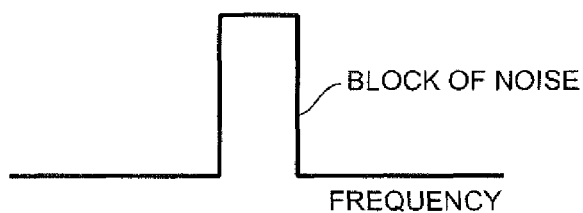
FIG. 6A is a spectral plot showing a signal with a rectangular spectrum.
Figure 6B:
FIG. 6B is a spectral plot of $2^{nd}$ order distortion.
Figure 6C:
FIG. 6C is a spectral plot of $3^{rd}$ order distortion.
Figure 6D:
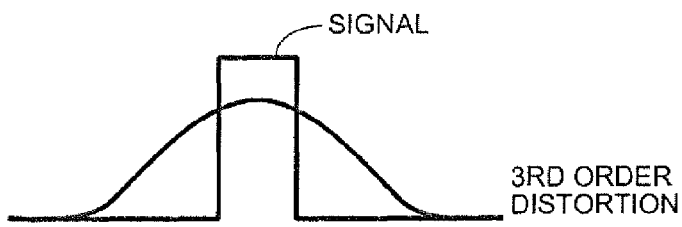
FIG. 6D is a spectral plot showing $3^{rd}$ order nonlinear distortion and the signal of FIG. 6A that created it.

FIGS. 6A-6D are diagrams showing how nonlinear distortion is created in the frequency domain. FIG. 6A is an undistorted signal that may be modeled as approximately a rectangular block of random noise. If the undistorted signal is distorted by a second order distortion, the created distortion components will have a triangular spectral shape as illustrated in FIG. 6B. This triangular shape is a result of a double convolution in the frequency domain of the signal of FIG. 6A. The center frequency of the distortion will be double the carrier frequency. Likewise, FIG. 6C is the spectrum of the distortion of the signal in FIG. 6A, distorted by third order distortion. The haystack shape is a result of a triple convolution of the signal of FIG. 6A. FIG. 6D is a superposition of the signal of FIG. 6A with the nonlinear distortion of FIG. 6C. Observe that some of the distortion energy is underneath the signal, and some distortion energy spreads into the upper and lower adjacent bands.

By processing measured energy in a vacant frequency band with manufactured or predicted energy in the same vacant frequency band, it is possible to determine if the captured energy was created by nonlinear distortion of a broadband Cable signals or some other unrelated uncorrelated source, such as random noise or ingress of broadcast signals. This is possible because, when the level of distortion is low from the "B" and "C" terms, and when gain "A" is normalized to unity:

$$E_{out} \sim A\ E_{in} \quad (2)$$

This approximation holds well for cable systems, which are designed to be highly linear and intolerant of high levels of any nonlinear distortion. Wireless power amplifiers are typically driven harder than cable amplifiers, but because of spectral mask requirements for spectral regrowth caused by nonlinear distortion, this approximation works well for linear wireless power amplifiers also.

Discussion Vacant Band Analysis

Thus, a broadband signal, captured at an endpoint, can be filtered to remove the measured energy in a vacant band, and then mathematically distorted to make manufactured (or created or predicted) energy in the same vacant band. The terms "vacant band" and "vacant bandwidth" are used interchangeably herein. The measured energy in the vacant band of the captured broadband signal was cut (e.g. by frequency domain filtering) and stored for processing. Next the manufactured energy is processed with the measured energy that was cut and saved from the vacant band to determine similarity or level of matching. A number of matching algorithms, as discussed below, may be used to determine if the manufactured energy matches the measured energy. Experiments were done with cross correlation, decorrelation, convolution, and deconvolution, which can be performed it the time domain, preferably in the frequency domain.

Figure 7:
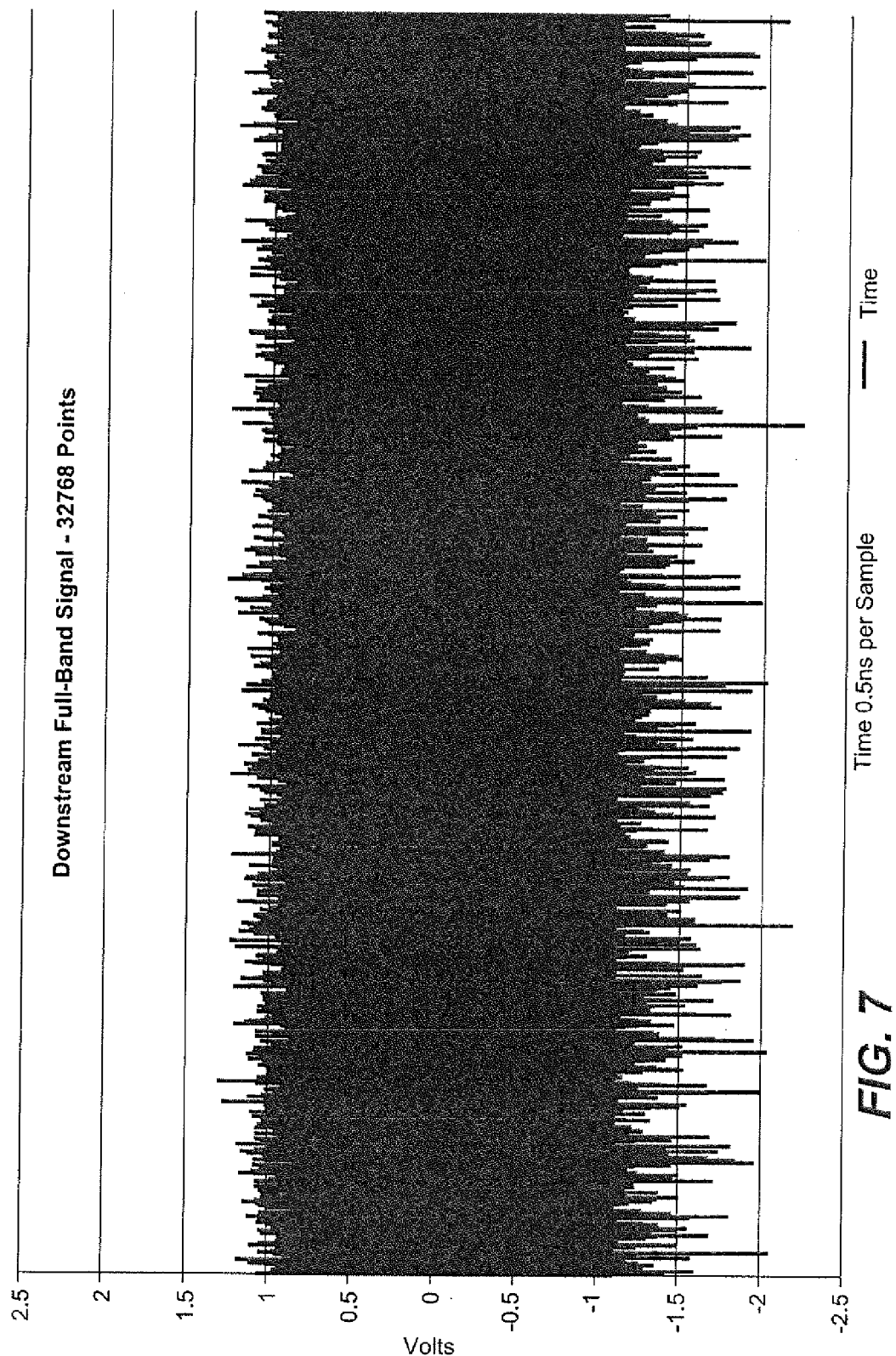
FIG. 7 is a temporal plot of a broadband signal with nonlinear distortion that was captured on a digital acquisition unit.

FIG. 7 is a temporal plot of a Cable downstream broadband signal with nonlinear distortion. This signal was also captured on the LeCroy digital 12-bit oscilloscope. The distortion was created by over-driving an amplifier with a broadband downstream cable signal. 32768 time samples were captured with 12 bit resolution using a sampling rate of 2.5 GSamples per sec. It is possible to observe that this amplifier's output is more compressed going to positive levels relative to negative levels, which would suggest that second order distortion is present.

Figure 8:
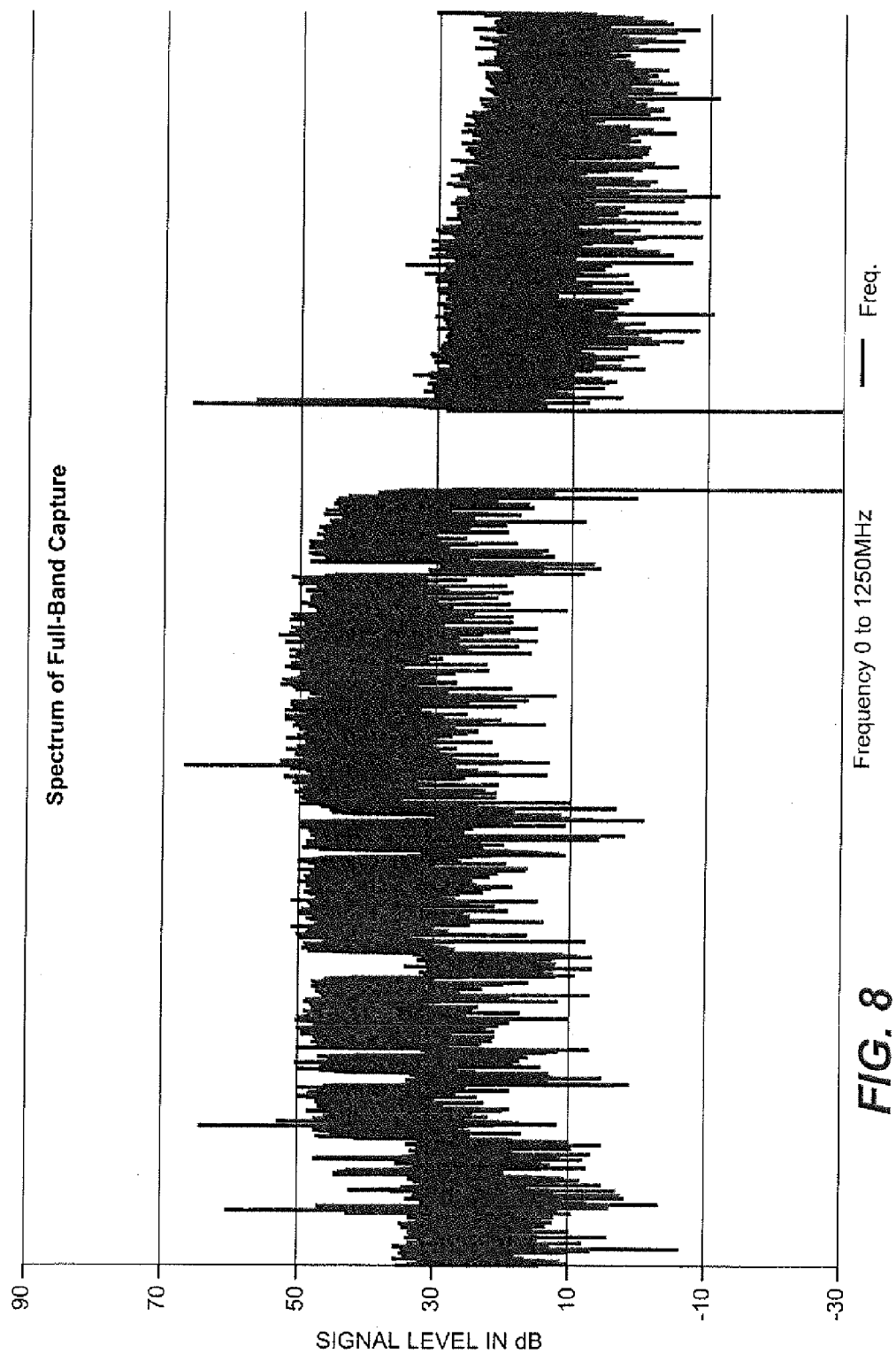
FIG. 8 is a spectral plot of the signal of FIG. 7 illustrating a vacant band that has been zeroed-out.
Figure 9A:
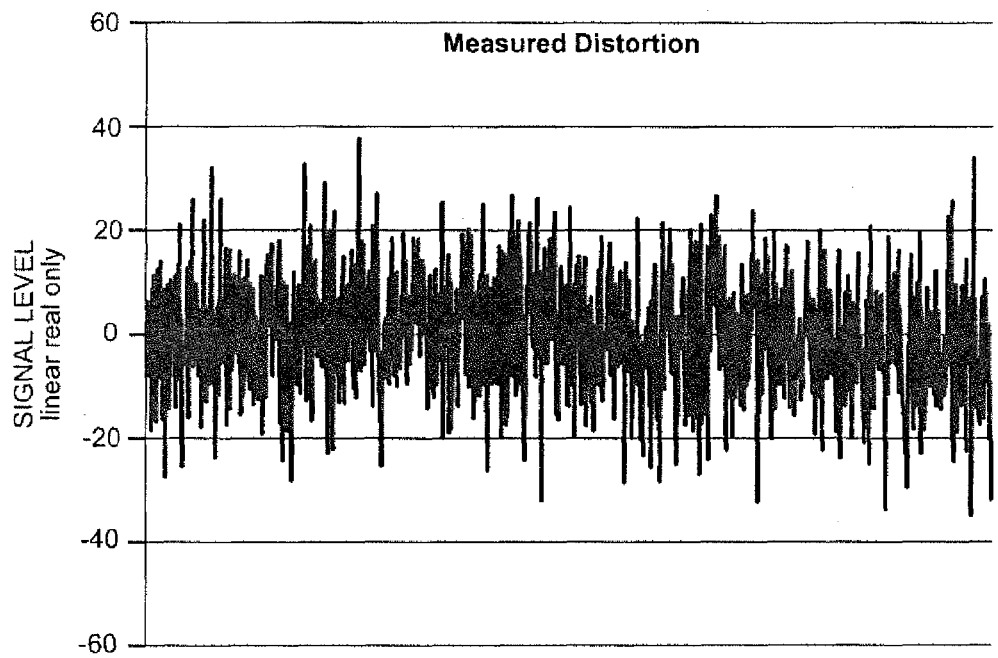
FIG. 9A is a spectral plot of measured distortion.

FIG. 8 is a result of a FFT of the 32768 time domain samples of FIG. 5. Only 16,384 points that are unique are illustrated. In the frequency domain, the left side is 0 Hz and the right side is 1250 MHz. The vertical axis is in decibels. The active signal occupies 54-860 MHz, but approximately 775 to 853 MHz is vacant (unoccupied) bandwidth. The measured signal in the vacant bandwidth (which contains noise and distortions) has been cut out and saved, and not shown in FIG. 8. The cut out and saved measured signal in the vacant bandwidth is shown in FIG. 9A. The saved noise and distortions in the measured vacant bandwidth have been replaced with zeroes (or negligible valued energy to prevent a plotting problem when the spectrum is graphed on a log axis) in FIG. 8. The vacant bandwidth in this example is comprised of 1024 complex frequency domain points.

Next, an IFFT is performed on the 32786 point complex spectral data of FIG. 8, which has a vacant band approximately 775 to 853 MHz (which is a spectral hole in the signal bandwidth) to make a time series containing said spectral hole. Alternatively, the vacant band or bandwidth can be a range of frequencies above or below the frequencies of the active signal. The resulting time series appears similar to the noise-like signal in FIG. 7, and is not illustrated. The time domain series with a spectral hole is next distorted by raising each TD sample to a power, such as by squaring (for second order) or cubing (for third order) each time domain sample in the data series.

$$E(t)_{2nd\ dist}=BE(t)_{in}^2 \quad (3)$$

$$E(t)_{3rd\ dist}=CE(t)_{in}^3 \quad (4);$$

where B and C are constants that can be chosen to approximately scale the level of distortion to match the expected distortion observed in the vacant band.

This squaring and cubing time domain process manufactures nonlinear distortion at all frequencies, but most importantly in the vacant band. The 1024 point time series with the manufactured distortion is converted into the FD (frequency domain) with a FFT, and the manufactured distortion in the vacant band with 1024 points is used to make the spectral plot of FIG. 9B.

FIG. 9A is a spectral plot of measured data that was cut and saved from the energy between 775 and 853 MHz in a previous step as noted above. There are also 1024 points in this FD plot.

Figure 9B:
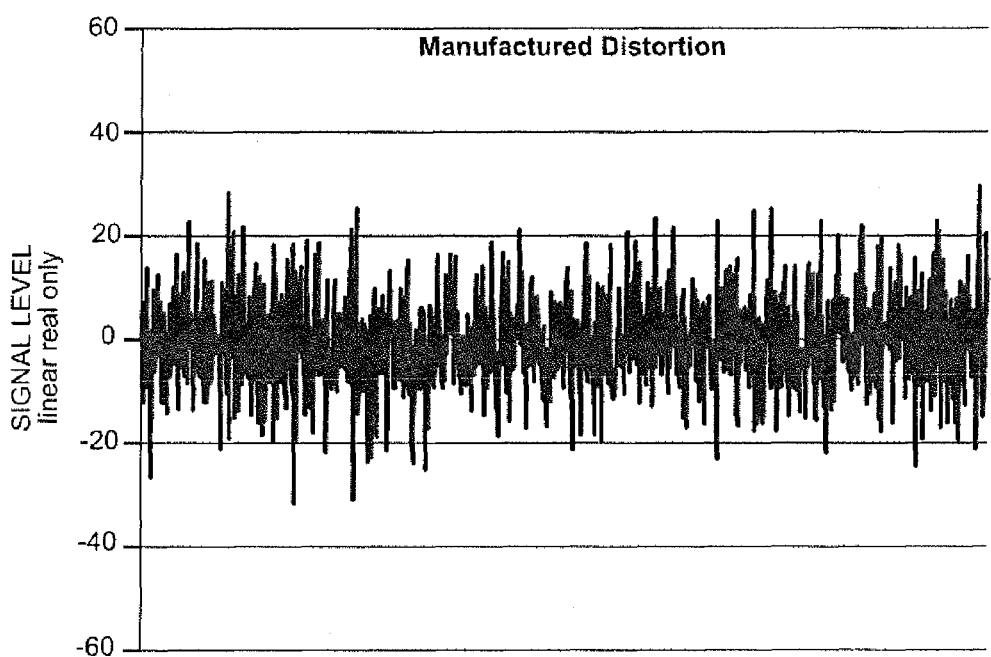
FIG. 9B is a spectral plot of manufactured or predicted distortion.
Figure 10:
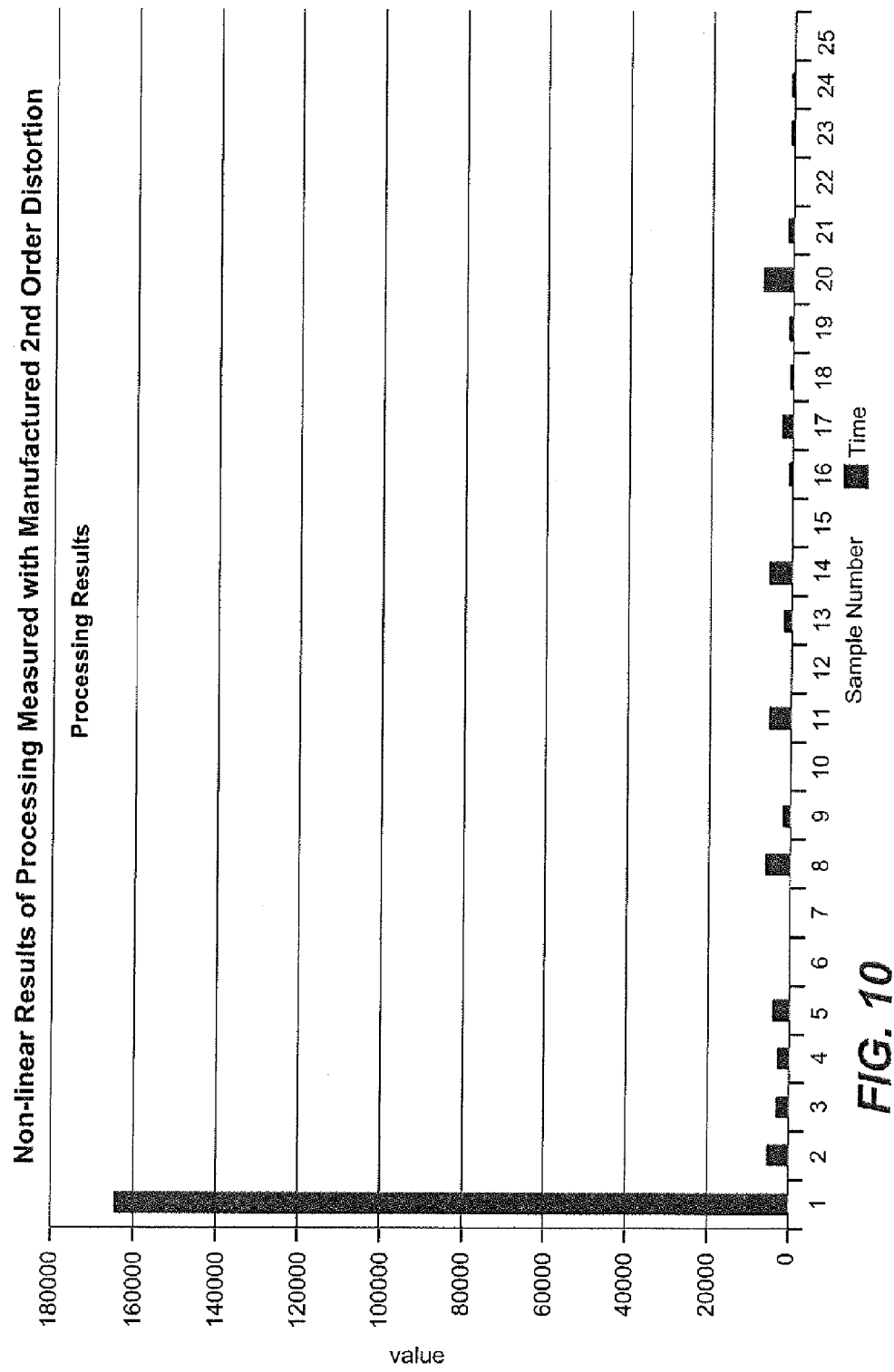
FIG. 10 is a temporal plot resulting from processing measured and manufactured distortion together.

FIG. 10 is a time domain result of processing the manufactured FD plot of FIG. 9B with the measured FD plot of FIG. 9A. The processing used was method 1 described below. The main 1st term (DC) on the left is elevated relative to other terms, indicating nonlinear distortion. Only the first 25 terms of the 1024 point processed result are illustrated, but the other terms have relatively small values, similar to samples 2-25. In the frequency domain the plot of FIG. 10 was computed as a frequency domain division of manufactured by measured values (method 1 mentioned below), followed by an IFFT to display the results in the time domain. In this application, the time domain processed result reveals similarities (or differences) between the two FD series of FIG. 9A and FIG. 9B. If the plots are completely similar, the processed result of FIG. 10 will have all of its energy at the DC term and zero everywhere else. If the plots are completely dissimilar the processed result will have an average amount of energy at the DC term relative to other terms. Thus, FIG. 10 shows definite $2^{nd}$ order distortion. An analysis of $3^{rd}$ order distortion (not illustrated) shows that it is also present, but not as severe as second order distortion. Distortions of higher orders than $3^{rd}$ order may also be present.

Processing Discussion

There are multiple DSP methods that can be used to determine the level of match between the manufactured and measured signals. Experiments have been done on 4 basic methods. Assuming the manufactured FD complex signal is X, and the measured FD complex signal is Y, methods are:
1. X/Y
2. X*Y
3. X*Y'
4. X/Y'

Where the Y' indicates the complex conjugate of Y

For digital cable signals, the best result was obtained by method 3, followed by method 1.

For test tones, method 4 yielded the best result.

Processing can be done in polar or rectangular form, with rectangular processing being computationally easier. Likewise, processing can also be performed by swapping the manufactured and measured responses.

The processing, as mentioned earlier, can alternately be done in the time domain. In the case of a time domain convolution, the number of resulting terms will be 2*n−1 where n (e.g. 1024 is the number of terms).

Other signal processing steps can be used to improve the plot of FIG. 10. An improvement is getting the DC main term higher relative to all other terms, indicating a better match between the measured signal and the manufactured signal. One step is to use a Tukey (or raised-cosine) window on the captured time waveform before processing. Another useful step is to apply a window on the manufactured and measured data in the FD.

Another piece of information not displayed in the plot of FIG. 10 is the phase angle of the main DC term. The main term is a complex number, but only the magnitude is displayed. The angle would give an indication of relative time (or phase) delay in the amplifier between the signal and distortion created by the signal, relative to the mathematical distortion manufacturing process.

In Cable diagnostic applications, additional small nonlinear distortions should normally be added at each amplifier output in a cascade. So when a sudden large jump of distortion is measured at the output of a cable amplifier (as illustrated in FIG. 10), the amplifier can be assumed to be damaged or operating at incorrect signal levels. Likewise, since Cable line amplifiers are push-pull type to cancel $2^{nd}$ order distortions, and elevated second order distortion is measured, the amplifier can assumed to be damaged (e.g. a final amplification stage is pushing more than it is pulling), or possibly another nonlinear element, such as a corrosion-created diode, is in the signal's path.

In testing for nonlinear distortion, a goal is to determine two things, how much energy is in the vacant band, and what is the nature of the energy in the vacant band. If the vacant band energy level is low, the nature of the energy is less important, as no repair is required.

The amplifiers and other equipment in wireless systems 200 may also experience the same type of impairment and give rise to second, third or still higher orders of distortions. The flow diagrams of FIGS. 11A, 11B, 11C described below also apply to wireless systems 200.

Figure 11A:
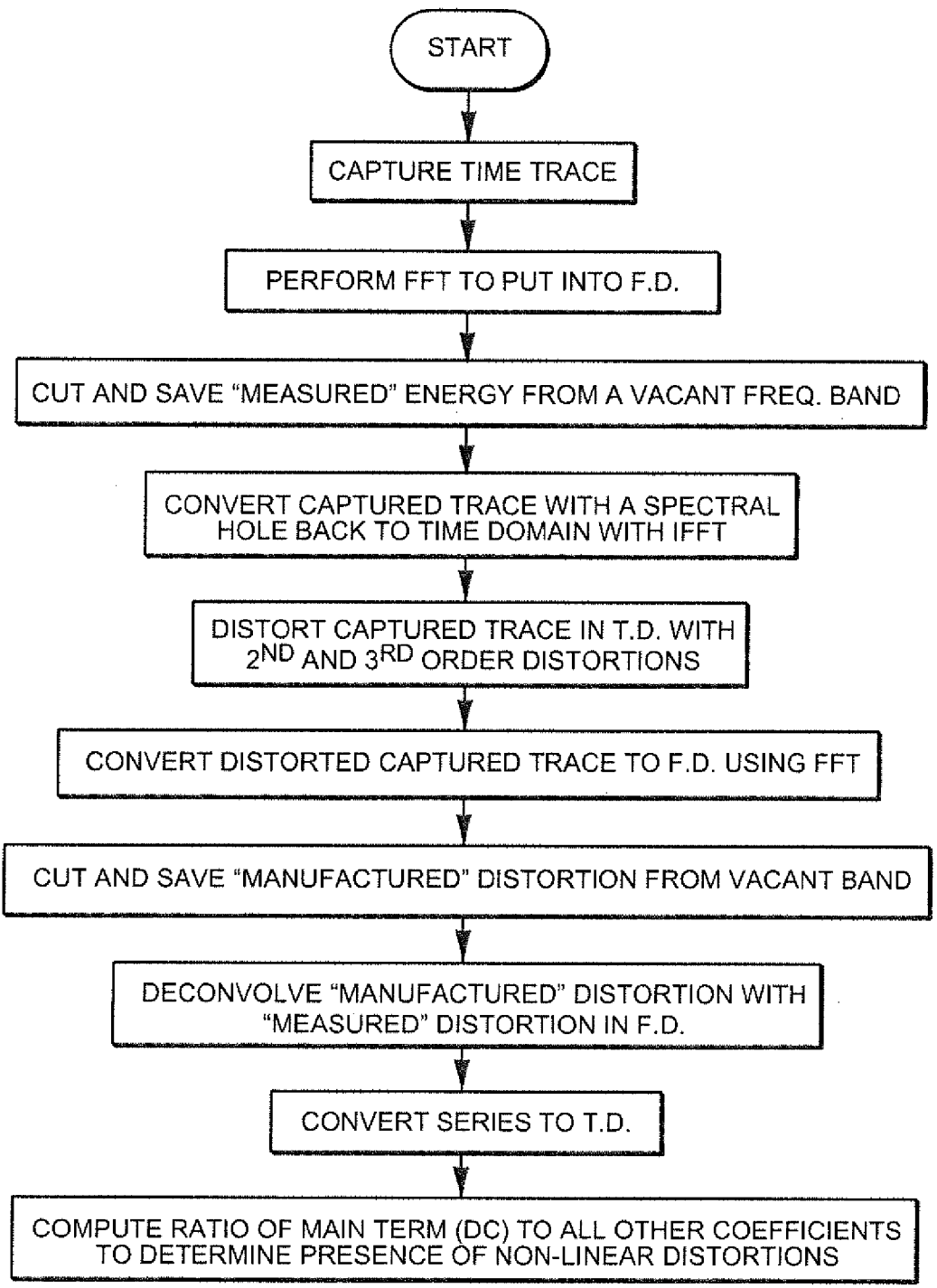
FIG. 11A, 11B, 11C are flow diagrams to determine nonlinear distortions using a vacant spectrum.

FIG. 11A is a flow diagram for the method to measure nonlinear distortion on a downstream signal in a vacant bandwidth. In a first step the process is started. In a second step the time trace with a vacant frequency band is captured. Optionally it can be windowed. In a third step the time trace is transformed with a FFT into the frequency domain. In a fourth step the energy in the vacant band is cut and saved as "measured" values. In a fifth step zeroes (or very small values) are inserted into the vacant band in the FD and the FD data series is converted back again into the TD with an IFFT. In a sixth step the TD data series is distorted by squaring and/or cubing each TD sample, creating "manufactured" distortions in the vacant band. In a seventh step the distorted TD data series is converted to the FD. In an eight step the manufactured distortion energy in the vacant band is cut and saved.

Optional FD windowing on both manufactured and measured data can improve the level of signal matching. In a ninth step the manufactured distortion from the vacant spectrum is processed with the measured distortion from the vacant spectrum. In a tenth step the FD results are converted to the time domain with an IFFT. In an eleventh step, the ratio of the main DC term to all other terms combined is computed. If the ratio exceeds a threshold, the distortion is declared excessive and a repair must be made.

Figure 11B:
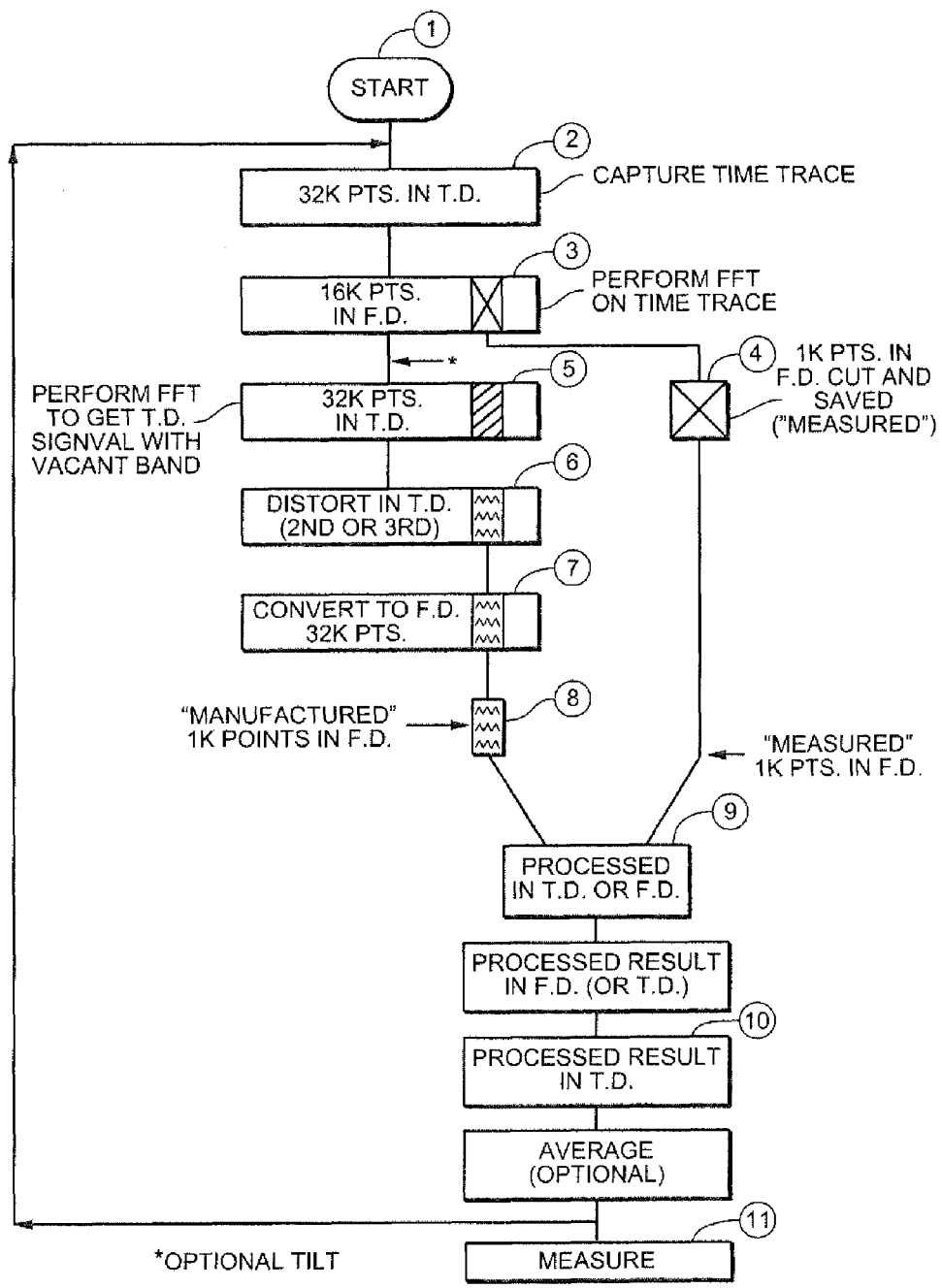

FIG. 11B is a flow diagram that shows in more detail the process of FIG. 11A. In step two, 32768 TD samples are captured from the received signal. In steps three and four, the samples are converted to FD and energy in the vacant band marked "X" is cut and saved as "measured" values in FD or TD. In step five, zeroes (or very small values) are inserted into the vacant band (which appears as a shaded box) in the FD and the data are converted to the TD with a IFFT. In step 6, the TD data is distorted (e.g. by squaring or cubing each TD sample), creating "manufactured" distortions in the vacant band. In step 7, the distorted captured trace is converted to FD by FFT. In step 8, the "manufactured" distortion of 1024 samples in the vacant band is cut out and saved. In step 9, the "manufactured" distortion is processed with the measured distortion from the vacant spectrum to obtain quotients (match coefficients). Step 9 may be performed in TD or FD. Where step 9 is performed in FD, in the tenth step, the FD quotients are converted to the time domain with an IFFT and saved. The above steps one through 10 are optionally repeated before step eleven, by the process returning back to step one, and the 1024 TD quotients obtained in the repeated process are averaged to obtain an average of many quotients. In an eleventh step, the ratios of the main DC term to all other terms combined is computed for the average quotient. The above process may be performed for any order of distortion such as the second or third order or both or more. If one or more of the ratios exceed a threshold, the distortion is declared excessive and a repair must be made.

Discussion Non-Vacant Band Analysis

This nonlinear distortion measuring process can be adapted to work in an occupied band with active signals to determine if the deterioration of the MER (modulation error rate or constellation spread) is due to non-linear distortion, or random noise and/or co-channel interference. If the signal can be demodulated correctly, it can be subtracted from the captured signal, leaving only the residual energy for non-linear distortion analysis.

Figure 12:
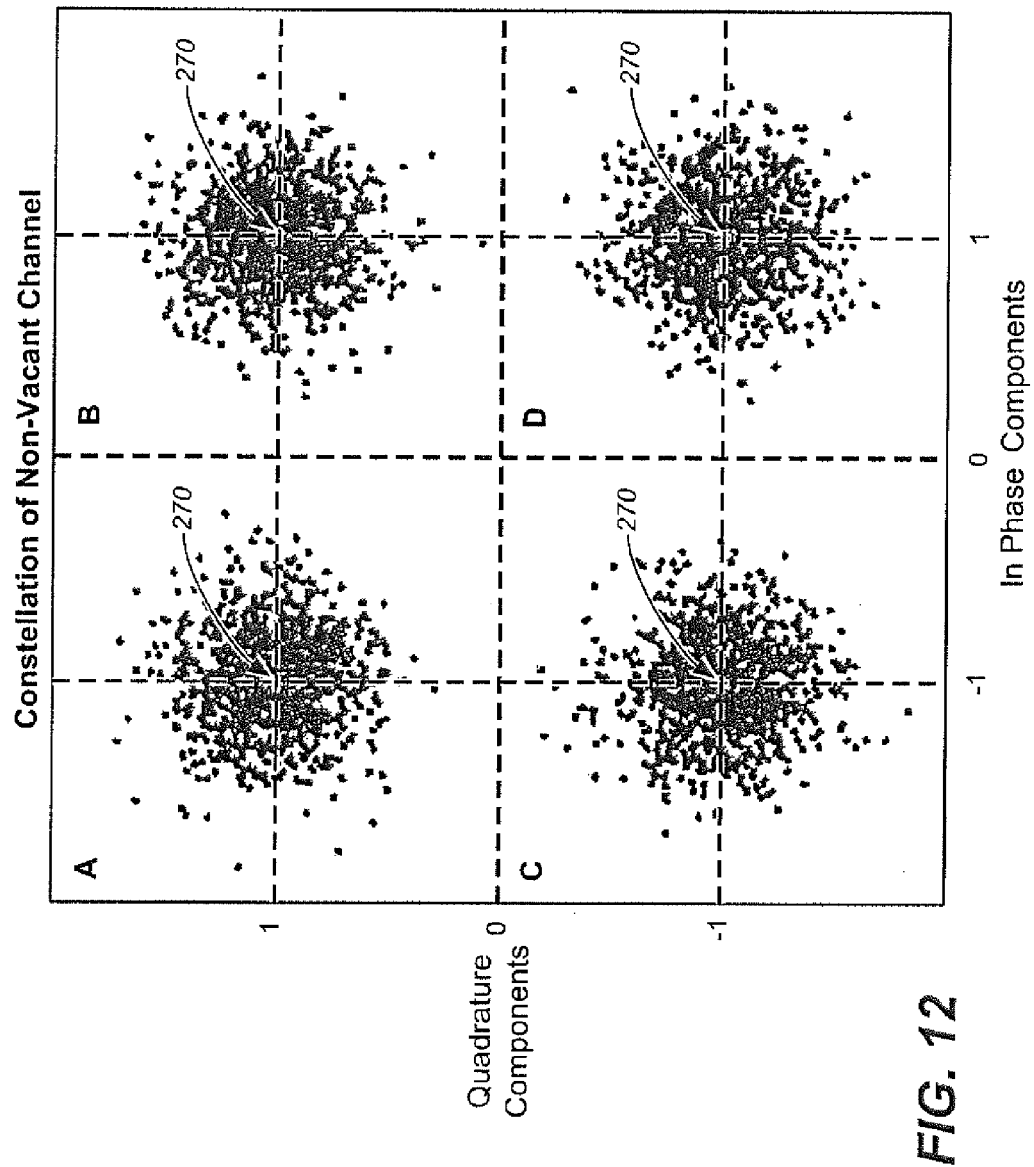
FIG. 12 is a QPSK constellation showing interference.

FIG. 12 is a constellation of a non-vacant channel, similar to what was illustrated in FIG. 6D. In this example, a QPSK (quadrature phase shift keyed) signal is captured and the crosses (4 dots 270 at intersections of vertical and horizontal dotted lines in the four quadrants A, B, C, D and at the center of the four quadrants) locate where each of the four possible symbols should have been ideally received. However, due to distortion and/or noise, there is a distribution or spread of received symbols (each dot represents the I and Q values of a received symbol). Since the interference is not too severe, the symbols' quadrants can be read correctly, even with the interference.

Figure 13:
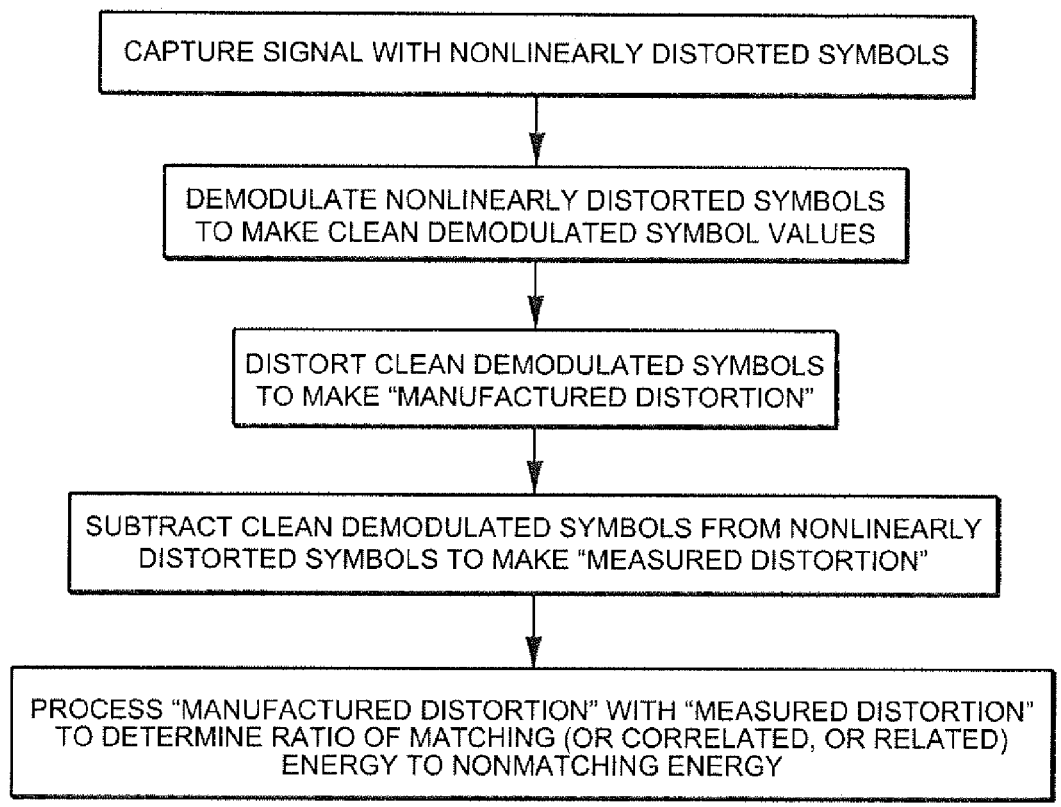
FIG. 13 is a flow diagram to determine nonlinear distortions using non-vacant spectrum. Identical components are labeled by the same numerals in this document.

So if the values at the crosses were subtracted from each received symbol, with subtraction depending on the quadrant of the symbol, a vacant band can be created containing distortion and noise, but no signal. Furthermore the demodulated signal that is subtracted from the received signal is a clean unimpaired signal that is used to manufacture distortion for processing with whatever is measured in the channel after subtraction. FIG. 13 is a flow diagram to measure nonlinear distortion in a non-vacant band. In a first step a signal with symbols and unknown energy are captured in the non-vacant band. In a second step the signal is demodulated to make clean demodulated symbols. In a third step the clean demodulated symbols are used to make manufactured distortion. In a fourth step the clean demodulated symbols are subtracted from the captured signal to make measured distortion. In a fifth step the manufactured distortion is processed with the measured distortion to determine how closely the manufactured and measured signals match.

When subtracting a signal, note that any linear distortions made by the signal should also be subtracted.

In one embodiment, a technician will go to an amplifier location of system 100, 100' or 200 and perform the test twice using two simultaneous captures, one channel of the data acquisition unit is attached to the input test point and one channel is connected to the output test point of said amplifier. This is possible if the data acquisition unit has two input channels capable of simultaneous capture. If too much additional distortion is measured, there is a problem, such as amplifier damage or excessive signal levels that must be remedied. For example, the technician may perform the test at point 124a, and also at 124b in FIG. 1A. If too much additional distortion is measured, there is a problem with amplifier 124 that must be remedied. In this embodiment a time adjustment may be made to correct for the small time delay between the data capture taken on the input test point and the data capture taken on the output test point. The two manufactured distorted signals and the two measured distorted signals may be processed as described above to determine whether the additional distortion introduced by amplifier 124 is excessive so that the amplifier needs to be repaired or replaced. Using two simultaneous captures is better than two separate captures when looking for small increases in distortion because the measurements will be relative to each other.

In a preferred embodiment, the measurements will be made by terminals. A vacant band may be created for this measurement by a CMTS (cable modem termination system) and last a very short time. In future DOCSIS transmissions, OFDM will be used for the downstream transmissions. OFDM can allow any desired number of the 4096 or 8192 component subcarriers to have a value of zero. This creates a vacant band for the OFDM symbol period, which could be only 20 or 40 microseconds. Alternately, every other subcarrier, such as the even numbered subcarriers, could have zero value, creating a partially-vacant band. The presence of nonlinear distortion can be measured in the vacant, or partially-vacant band on an OFDM transmission. In this embodiment, it would be desirable to synchronize the sample capture period with the OFDM symbol period.

If noise reduction is needed, averages can be done by repeating the steps in FIGS. 5, 11A, 11B, and 13. This would reduce the effects of the sample size being too small. It is expected that terminals will not have very deep memory for many samples, so averaging will be useful. Experiments indicate averaging, as well as windowing, to be valuable to improve the quality of signal matching.

By making distortion measurements on terminals, the failed amplifiers can be located without a "truck roll" by technicians. This is done by noting which amplifiers along a signal transmission path feed a terminal that is detecting excessive distortion, and which amplifiers feed terminals that are not detecting excessive distortion.

Note that one embodiment of signal processing was illustrated. Because of the dual nature of time and frequency, processing can be done in the time domain or frequency domain with identical results. Other known digital signal processing techniques, such as windowing, zero padding and averaging can improve test results.

Other Comments:

If the vacant band is not wide enough to use a convenient size FFT, such as 1024 in the above embodiment, the technique of "zero stuffing" can be used on top of frequencies that are occupied. The same "zero stuffed" frequencies would be used for both the manufactured and measured signals. Likewise, it is possible to zero-stuff to blank out signals that might be occupying a portion of the vacant band.

If a histogram is built of many time domain voltage samples, the distribution curve should look normal, however any deviation of the curve from normal will indicate problems, such as clipping or other nonlinear distortion.

The manufactured distortion may alternately be created in the frequency domain by a double (for second order) or triple (for third order), or even higher multiple, complex convolution of the FD samples with themselves, as illustrated in FIG. 6b and FIG. 6c. This can produce a mathematically similar result to TD processing.

These methods works equally well on Cable upstream signal paths, where the linear distortions could be caused by the signal path and nonlinear distortions could be caused by either amplifier nonlinearity or by analog laser nonlinearity or clipping. In the case of laser clipping, higher order terms in the Taylor series should be considered above the $3^{rd}$ due to the abrupt nature of laser clipping. A cable upstream signal may be evaluated for nonlinear distortion using either the vacant upper and/or lower bands, or by demodulating and subtracting the signal, thereby creating a vacant band where the upstream signal was located.

The distortion measuring technique disclosed here used the full band signal for manufacturing distortion. Just spectral portions of the full band signal can alternately be used for the analysis. This will reveal which spectral components were most influential in creating the distortion measured in the vacant band. Thus, this technique can be used as a research tool to improve amplifier design.

Another application for the nonlinear testing process is evaluating amplifier performance. This is done by using a broadband random noise signal with a vacant band as a test signal. This test could be done on a single amplifier on the bench or a cascade of amplifiers in the field. A noise-like test signal could be generated by transmissions from terminal units in the field.

While nonlinear distortions are normally created by amplifiers or lasers, others sources of nonlinear distortions exist, such as diodes created by corroded metal contacts.

The above discussion was based on downstream cable systems. This technique will also work on upstream cable systems. In this upstream cable system, multiple transmissions can be simultaneously generated by multiple terminals at multiple endpoints. The point at which the distortion was added can be the terminal device, a common amplifier, or a common laser transmitter. Thus, by associating the distortion in a vacant upstream band, it is possible to determine which terminal(s) contributed to the composite distortion. With knowledge of the upstream cable topology, it is possible to locate where nonlinear distortion was created. For example, if terminals A, B, and C are all transmitting during the same capture period, and the distortion is determined to include A and B, but not C, the distortion was created on a path common to A and B, but not C.

Two Trace Methods of Processing

The manufactured distortion may alternately be created from a trace captured at the hub site and processed with a measured trace captured in the field. This is illustrated in FIG. 1B, in system 100', which is a variation of system 100 of FIG. 1A and an alternative embodiment of the invention. At the hub site 104 a full spectrum of the signal trace is captured and stored in storage 302. A full spectrum of the signal trace captured at an endpoint such as at 156 (one of the taps 140) is captured and stored in storage 304. The two traces are captured at the same relative time as controlled by trigger circuits 306 so that the capturing of the two traces is synchronized, and are sent to a DSP 308. The signal trace captured at the hub site should be free of distortion and noise, so this method would appear on the surface to yield superior results. However, due to the difficulty of a synchronized capture of matching two time traces that are separated by many kilometers and many hundreds of microseconds of transit delay, this method is not a preferred embodiment. The triggers can be synchronized by using the global positioning system or can alternately be synchronized by a trigger signal embedded in the downstream signal. For example, a trigger signal could be placed in the vacant band, and the trace captured immediately after the trigger signal in both the hub site and in the field. If there is a relative time delay between the two captured traces, the main DC term illustrated in FIG. 10 will shift in time to the left or right. If the global positioning system is used, the trigger in the field must be delayed to account for the travel time. Likewise a very deep memory can be employed and autocorrelation, as illustrated in FIG. 4 and be used for a measure of transit delay.

Figure 11C:
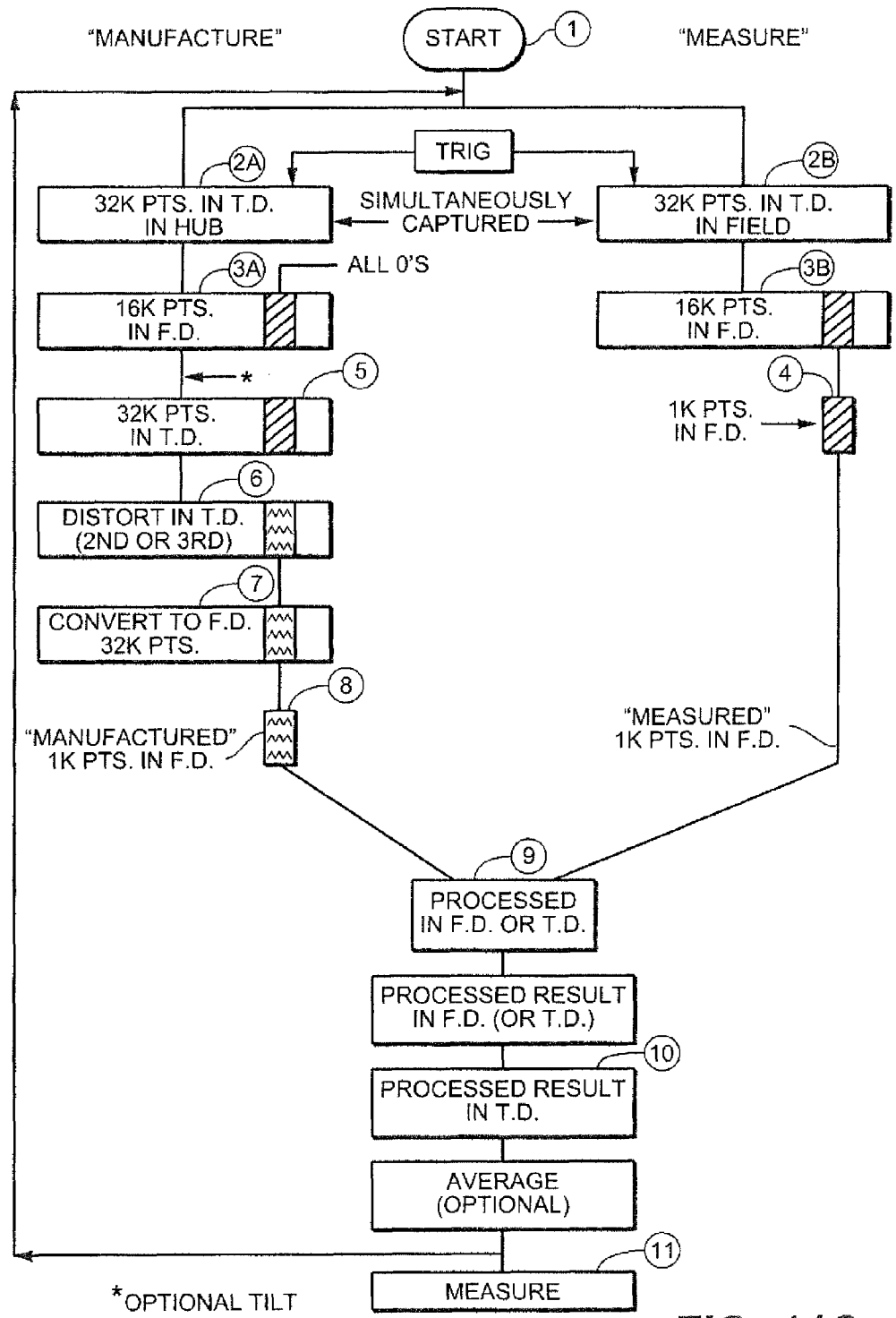

FIG. 11C is a flow diagram for the method to measure nonlinear distortion on a downstream signal in a vacant bandwidth in system 100' of FIG. 1B. In step one, trigger circuits 306 supply trigger signals to circuit blocks 302, 304, causing the circuit blocks to capture 32768 samples in TD both at the hub 104 and at an endpoint such as 156 in the field at substantially the same relative time in steps 2A and 2B, allowing for transit delay. The two sets of 32768 TD samples are converted to 16,384 unique FD samples by FFT in steps 3A, 3B. The 16,384 FD samples from the hub will contain a vacant band shown as a shaded area on the left side in FIG. 11C. The 16,384 FD samples from the endpoint in the field will also contain a vacant band shown as a shaded area in FIG. 11C on the right side. In step four, 1024 FD samples in the vacant band of the 16,384 FD samples from the endpoint in the field are cut and saved. Each frequency sample in the 16,384 FD samples from the hub optionally has its vacant band zeroed out and then converted into the time domain with a IFFT in step five to yield 32768 samples in TD. In step six, the 32768 samples in TD from step five are distorted (e.g. by squaring or cubing each sample) to create distortion in the vacant band. In step seven, 1024 TD samples in the vacant band of the 16,384 distorted FD samples from the hub are cut and saved. In step eight, the 1024 TD samples from step seven are converted into the FD with a FFT. In step nine, the two sets of 1024 FD samples each from steps four and eight are processed in FD (or in TD). The processed results is stored and the system optionally returns to step one, and the processing result obtained in this next round is averaged with the stored processing result from the previous round to yield an averaged processing result. The averaged result may be a set of quotients where processing is performed in FD. As in an embodiment described above, if this ratio of main term to all other terms exceeds a set threshold, excessive distortion is declared requiring repair.

The DSP processing can occur at the hub site, at the terminal, or in some other location. The Internet may be used to transport simultaneously captured traces.

To provide the best uniform distortion performance in Cable broadband amplifiers, the output levels are normally operated with uptilt, meaning signals at 54 MHz are attenuated relative to signals at 860 MHz. Uptilt creates nonlinear distortion more uniform across the entire band. A typical uptilt could be, for example 7 to 9 dB or more. This means that when distortion was created in an amplifier, the signal was likely uptilted. But after traveling a distance over coaxial cable, which attenuates high frequencies more than low frequencies, the captured signal (used for making distortion) may be downtilted. So the optimal level of distortion matching can be tested by optionally uptilting or downtilting the captured signal before manufacturing the $2^{nd}$ or $3^{rd}$ order distortion. The tilt that yields the best match will also give an indication about the broadband signal's tilt at the point in the network where the distortion was created. In FIGS. 11B and 11C, tilt can be performed in the frequency domain where the asterisks (*) are shown.

If, in future versions of the DOCSIS standard, a mechanism is placed in the downstream signal to enable simultaneous capture of time traces with remote locations, the two trace method of processing will be become easier.

The method for testing in a non-vacant band can be applied where several downstream carriers are removed. If a wider bandwidth is vacated, the test results will be better.

Technique works for wireless signals as well as audio signals. In the case of a wireless signal, the vacant band can be just above the signal, just below the signal, or the vacant band can be comprised of both bands. Alternately, the wireless signal, if it can be demodulated, can be subtracted from the channel, and distortion measured in the newly-vacated channel.

In the case of testing audio amplifiers, an audio notch filter can be inserted into the input line feeding the amplifier and the notch frequencies can be used as the "vacant band". Either the one trace or two trace DSP method can be used to analyze the measured energy in the vacant band. White or pink noise can be used as an audio test signal.

While the invention has been described above by reference to various embodiments, it will be understood that changes and modifications may be made without departing from the scope of the invention, which is to be defined only by the appended claims and their equivalents.

What is claimed is:

1. A method for reducing a constellation spread of a source signal containing linear and nonlinear distortion, comprising the steps of:
    capturing a wideband noise-like signal at an endpoint of a signal path containing linear distortion and nonlinear distortion;
    processing said captured wideband noise-like signal with an autocorrelation algorithm;
    measuring time delay as time between impulses on an autocorrelation plot obtained from the processing to determine the linear distortion;
    demodulating the captured wideband noise-like signal, and
    subtracting the linear distortion from the demodulated signal.

2. The method according to claim 1, further comprising determining a distance from said time delay on said autocorrelation plot.

3. The method according to claim 1, wherein said capturing and processing are repeated to obtain a plurality of autocorrelation plots, said method further comprising averaging said autocorrelation plots to arrive at an averaged autocorrelation plot, and wherein said averaged autocorrelation plot is used to determine said distance.

4. The method according to claim 1, where the linear distortion is created by an echo tunnel, group delay or amplitude shift.

5. The method according to claim 1, further comprising filtering out from said wideband noise-like signal nonrandom signals before said processing.

6. The method according to claim 1, wherein said capturing is performed by an end terminal device.

7. The method according to claim 1, wherein said capturing is performed by test equipment comprising a digital acquisition device.

8. The method according to claim 1, wherein said capturing is performed by a semiconductor chip, an oscilloscope, or a DAQ card.

9. The method according to claim 1, wherein said capturing, processing, measuring and determining are performed multiple times, said method further comprising calculating an average of the impulses from autocorrelation plots obtained from the processing to reduce a background noise floor.

10. The method according to claim 1, wherein said wideband noise-like signal is transmitted from a provider of television, internet and/or telephone services to a customer, or from said customer to said provider.

11. The method according to claim 1, wherein said signal path includes a coaxial cable or optical fiber or a wireless channel.

12. The method according to claim 1, wherein said capturing and processing captures and processes signals having a bandwidth of at least 6 MHz.

13. The method according to claim 1, wherein said capturing and processing captures and processes signals having a bandwidth of up to at least 192 MHz.

14. The method according to claim 1, said processing providing an autocorrelated signal, wherein said autocorrelated signal is used to calculate a background noise floor reference signal that is subtracted from a background noise floor in said wideband noise-like signal at an endpoint.

* * * * *